(12) United States Patent
Marjelund et al.

(10) Patent No.: US 8,364,196 B2
(45) Date of Patent: *Jan. 29, 2013

(54) CELL RESELECTION SIGNALLING METHOD

(75) Inventors: Pekka Marjelund, Espoo (FI); Juha Turunen, Espoo (FI); Kaisu M. Iisakkila, Espoo (FI); Oscar Salonaho, Helsinki (FI)

(73) Assignee: Sisvel International S.A., Luxembourg (LU)

( * ) Notice: Subject to any disclaimer, the term of this patent is extended or adjusted under 35 U.S.C. 154(b) by 344 days.

This patent is subject to a terminal disclaimer.

(21) Appl. No.: 12/229,085

(22) Filed: Aug. 19, 2008

(65) Prior Publication Data

US 2009/0029712 A1 Jan. 29, 2009

Related U.S. Application Data

(63) Continuation of application No. 10/181,078, filed as application No. PCT/FI01/00038 on Jan. 17, 2001, now Pat. No. 7,433,698.

(30) Foreign Application Priority Data

Jan. 17, 2000 (FI) ..................................... 20000090

(51) Int. Cl.
*H04M 1/00* (2006.01)
(52) U.S. Cl. ............... 455/550.1; 455/432.1; 455/435.1; 455/436; 455/438; 455/442; 455/450; 455/453; 455/455; 455/462; 455/464; 370/332
(58) Field of Classification Search ............... 455/432.1, 455/435.2, 436, 438, 442, 450–453, 455, 455/462, 464, 550.1; 370/332
See application file for complete search history.

(56) References Cited

U.S. PATENT DOCUMENTS

| 4,654,879 | A | * | 3/1987 | Goldman et al. | 455/440 |
|---|---|---|---|---|---|
| 4,670,899 | A | * | 6/1987 | Brody et al. | 455/453 |
| 5,315,586 | A | | 5/1994 | Charvillat | 370/60 |
| 5,483,668 | A | | 1/1996 | Malkamaki et al. | 455/33.2 |
| 5,604,744 | A | | 2/1997 | Andersson et al. | 370/347 |
| 5,701,301 | A | | 12/1997 | Weisser, Jr. | 370/428 |
| 5,710,974 | A | | 1/1998 | Granlund et al. | 455/33.2 |
| 5,724,665 | A | | 3/1998 | Abbasi et al. | 455/561 |
| 5,726,981 | A | | 3/1998 | Ylitervo | 370/332 |
| 5,892,759 | A | | 4/1999 | Taketsugu | 370/349 |
| 5,903,840 | A | | 5/1999 | Bertacchi | 455/436 |

(Continued)

FOREIGN PATENT DOCUMENTS

| JP | 9009330 A | 1/1997 |
|---|---|---|
| JP | 9307939 A | 11/1997 |

(Continued)

OTHER PUBLICATIONS

TSG RAN Working Group 2 (Specification of RRC Procedure: RRC Connection Establishment), Aug. 16, 1999, Ericsson, pp. 1-5.*

(Continued)

*Primary Examiner* — Steve D Agosta
(74) *Attorney, Agent, or Firm* — Harrington & Smith

(57) ABSTRACT

The invention relates to methods pertaining to cell reselection in a cellular telecommunication system. According to the invention, a connection setup rejection message is used to direct a mobile communication means to attempt a new connection with certain parameter values such as a certain carrier frequency. A plurality of parameter values may as well be indicated in the message, which allows the network to direct the mobile communication means to make a connection setup request to a specific cell, for example. The connection setup rejection message can be for example the CONNECTION SETUP REJECT message of the RRC protocol.

20 Claims, 2 Drawing Sheets

U.S. PATENT DOCUMENTS

| | | | | |
|---|---|---|---|---|
| 5,953,665 | A | 9/1999 | Mattila | 455/434 |
| 5,956,368 | A | 9/1999 | Jamal et al. | 375/206 |
| 6,101,399 | A | 8/2000 | Raleigh et al. | 455/561 |
| 6,112,098 | A | 8/2000 | Flint et al. | 455/464 |
| 6,161,013 | A | 12/2000 | Anderson et al. | 455/435 |
| 6,185,423 | B1 * | 2/2001 | Brown et al. | 455/434 |
| 6,205,335 | B1 | 3/2001 | Furusawa et al. | 455/436 |
| 6,240,287 | B1 * | 5/2001 | Cheng et al. | 455/453 |
| 6,256,500 | B1 | 7/2001 | Yamashita | 455/441 |
| 6,282,419 | B1 * | 8/2001 | Findikli | 455/434 |
| 6,510,146 | B1 | 1/2003 | Korpela et al. | 370/332 |
| 6,574,456 | B2 | 6/2003 | Hamabe | 455/63 |

FOREIGN PATENT DOCUMENTS

| | | |
|---|---|---|
| JP | 10191441 A | 7/1998 |
| JP | 11341555 A | 12/1999 |
| WO | WO 97/47154 | 12/1997 |
| WO | WO-98/36607 A2 | 8/1998 |
| WO | WO 99/49598 | 9/1999 |
| WO | WO 00/16581 | 3/2000 |
| WO | WO 00/67511 | 11/2000 |

OTHER PUBLICATIONS

Mykhin A.M. "Mobile Communication Encyclopedia. vol. 1. Communication System of Public Mobil Service",St-Petersburg, Nakua I Tekhnika Publishers 2001, p. 145.

Goldshtgein B.S. "Protocols of Access Network. vol. 2", Moscow, Radio I Svyaz Publishers, 2001, p. 140.

Translation of a Korean Office Action dated May 9, 2005 in corresponding Korean Application No. 7008333/2002.

Antipolis, Sophia; Specification of RRC Procedure: RRC connection establishment; Ericcson/TSG-RAN Working Group; Aug. 16-20, 1999; pp. 1-5.

* cited by examiner

CELL RESELECTION SIGNALLING METHOD

CROSS REFERENCE

This patent application is a continuing application of U.S. application Ser. No. 10/181,078, filed Jul. 12, 2002, now U.S. Pat. No. 7,433,698 which is a national stage of PCT application NO. PCT/FI01/00038 filed on Jan. 17, 2001 the disclosure of which is incorporated by reference in its entirety. Priority is claimed on that application and on Application No.: 20000090, filed in Finland on Jan. 17, 2000.

BACKGROUND OF THE INVENTION (US)

1. Field of the Invention

The invention relates to methods pertaining to cell reselection in a cellular telecommunication system. Especially, the invention is related to such a method as specified in the preamble of the first independent method claim.

2. Description of Related Art

For clarification of common terms used in this document, an overview of certain cellular telecommunication system configurations is presented in the following.

Proposals for third-generation systems include UMTS (Universal Mobile Telecommunications System) and FPLMTS/IMT-2000 (Future Public Land Mobile Telecommunications System/International Mobile Telecommunications at 2000 MHz). In these plans cells are categorised according to their size and characteristics into pico-, nano-, micro- and macrocells, and an example of the service level is the bit rate. The bit rate is the highest in picocells and the lowest in macrocells. The cells may overlap partially or completely and there may be different terminals so that not all terminals necessarily are able to utilise all the service levels offered by the cells.

FIG. 1 shows a version of a future cellular radio system which is not entirely new compared with the known GSM system but which includes both known elements and completely new elements. In current cellular radio systems the bottleneck that prevents more advanced services from being offered to the terminals comprises the radio access network RAN which includes the base stations and base station controllers. The core network of a cellular radio system comprises mobile services switching centres (MSC), other network elements (in GSM, e.g. SGSN and GGSN, i.e. Serving GPRS Support Node and Gateway GPRS Support node, where GPRS stands for General Packet Radio Service) and the related transmission systems. According e.g. to the GSM+ specifications developed from GSM the core network can also provide new services.

In FIG. 1, the core network of a cellular radio system 930 comprises a core network CN 931 which has three parallel radio access networks linked to it. Of those, networks 932 and 933 are UMTS radio access networks and network 934 is a GSM radio access network. The upper UMTS radio access network 932 is e.g. a commercial radio access network, owned by a telecommunications operator offering mobile services, which equally serves all subscribers of said telecommunications operator. The lower UMTS radio access network 933 is e.g. private and owned e.g. by a company in whose premises said radio access network operates. Typically the cells of the private radio access network 933 are nano- and/or picocells in which only terminals of the employees of said company can operate. All three radio access networks may have cells of different sizes offering different types of services. Additionally, cells of all three radio access networks 932, 933 and 934 may overlap either entirely or in part. The bit rate used at a given moment of time depends, among other things, on the radio path conditions, characteristics of the services used, regional overall capacity of the cellular system and the capacity needs of other users. The new types of radio access networks mentioned above are called generic radio access networks (GRAN). Such a network can co-operate with different types of fixed core networks CN and especially with the GPRS network of the GSM system. The generic radio access network (GRAN) can be defined as a set of base stations (BS) and radio network controllers (RNC) that are capable of communicating with each other using signaling messages. Below, the generic radio access network will be called in short a radio network GRAN.

The terminal 935 shown in FIG. 1 is preferably a so-called dual-mode terminal that can serve either as a second-generation GSM terminal or as a third-generation UMTS terminal according to what kind of services are available at each particular location and what the user's communication needs are. It may also be a multimode terminal that can function as terminal of several different communications systems according to need and the services available. Radio access networks and services available to the user are specified in a subscriber identity module 936 (SIM) connected to the terminal.

A conventional way to treat a connection setup request in a congestion situation is to simply reject the connection setup request. Thereafter the mobile station (MS) needs to find a new cell for a new connection attempt. The problem with this approach is a high amount of failed signalling, if the mobile station needs to make several connection attempts to several different cells before finding a cell, which accepts the new connection. Such a situation may arise, when many of the surrounding cells are congested as well. The setup of the connection can therefore also take a long time, which may frustrate the user of the mobile station.

One other prior art way of treating a connection setup request congestion situation is to perform the connection setup as requested by the mobile station, and directly thereafter force a handover to a less congested cell. Such a method is quite satisfactory from the viewpoint of the user of the mobile station, since the network accepts the new connection quickly, but such a method causes too much signalling in the form of handover signalling.

At the time of writing this patent application, the RRC specifications of third generation cellular networks the network has no explicit control over which cell the UE selects after an RRC connection setup is rejected in the serving cell. It has also been a problem in the GSM system that after the rejection of signaling connection request, cell reselection and reattempt actions of mobile stations have not been under control of the network.

SUMMARY OF THE INVENTION

An object of the invention is to realize a cell reselection method, which requires only a small amount of signalling. A further object of the invention is to realize a cell reselection method, which allows the network to have some control over the actions of the mobile stations in a connection rejection situation.

The objects are reached by indicating information affecting the determination of at least one parameter for a new connection attempt in a connection setup rejection message.

The channel reselection signalling method in a cellular telecommunications network according to the invention is characterized by that, what is specified in the characterizing part of the independent claim directed to a channel reselection signalling method in a cellular telecommunications network. The channel reselection method in a mobile communication means of a cellular telecommunication system according to the invention is characterized by that, what is specified in the characterizing part of the independent claim directed to a channel reselection method in a mobile communication means of a cellular telecommunication system. The network element according to the invention is characterized by that, what is specified in the characterizing part of the independent claim directed to a network element. The dependent claims describe further advantageous embodiments of the invention.

According to the invention, a connection setup rejection message is used to direct a mobile communication means to attempt a new connection with certain parameter values such as a certain carrier frequency. A plurality of parameter values may as well be indicated in the message, which allows the network to direct the mobile communication means to make a connection setup request to a specific cell, for example. The connection setup rejection message can be for example the CONNECTION SETUP REJECT message of the RRC protocol.

In one advantageous embodiment, the network indicates a carrier frequency in the connection setup rejection message. After receiving the message, the mobile communication means attempts to set up a new connection to a cell which uses the carrier frequency. There may be more than one such cell. For example, in the WCDMA cellular system under development a plurality of cells may use the same carrier frequency. In such a case, the mobile station needs to select one of the cells for the new attempt.

In a further advantageous embodiment, the network indicates a carrier frequency and information identifying a certain cell among the cells using the indicated carrier frequency. Such information identifying a certain cell can advantageously be for example a scrambling code corresponding to the cell. Since these parameters define a certain cell, the mobile station does not need to select one cell among those using the carrier frequency, which shortens the time needed for setting up the desired connection. In a still further advantageous embodiment of the invention, the network indicates a cellular network identifier in the rejection message. This embodiment is advantageous in those cases, when more than one cellular network exists in the same geographical area and the mobile communication means is capable of using at least two, even plurality of different networks. For example, this embodiment allows a UMTS (Universal Mobile Telecommunications System) network to direct a mobile station to make a connection attempt to a GSM (Global System for Mobile Communication) network to a GPRS (General Packet Radio Service) network, to a EDGE-capable (Enhanced Data rates for GSM Evolution) network, or to some other network.

The network may also indicate other parameters in the rejection message, such as for example parameter values for certain timers affecting the timing of the next connection attempt, time difference of the cell transmitting the rejection message and the cell suggested by the network, and parameter values identifying certain transmission channels to use. Parameter values for certain transmission channels can be for example parameter values describing a certain primary common pilot channel (CPICH) if the desired connection is a FDD (frequency division duplex) mode connection of the WCDMA system or a certain primary common control physical channel (CCPCH) if the desired connection is a TDD (time division duplex) mode connection of the WCDMA system.

In a further advantageous embodiment of the invention, the mobile communication means obtains at least one parameter value from a system information message, if the rejection message indicates a certain cause of rejection. For example, if the rejection message indicates that the cause is congestion, the mobile communication means can obtain a carrier frequency from a system information message for the next connection attempt. In an advantageous embodiment of the invention, such a system information message is a System Info Block Type 5 message of the RRC protocol according to certain specifications of the WCDMA system.

BRIEF DESCRIPTION OF THE DRAWINGS

Various embodiments of the invention will be described in detail below, by way of example only, with reference to the accompanying drawings, of which

A description of FIG. 1 was given earlier in connection with the description of the state of the art. Same reference numerals are used for similar entities in the figures.

DETAILED DESCRIPTION OF THE PREFERRED EMBODIMENTS

Although a congestion situation typically arises because of shortage in the resources of a whole cell, a congestion situation may as well arise because of shortage in the radio resources of a channel, such as too many users in the channel. A connection rejection message may result from channel congestion as well. Therefore, in the following explanation and especially in the claims the term channel is used to cover a cell as well as a specific channel according to specific frequency, code, etc. parameters. As a handover can mean a change of certain connection parameters such as code or frequency as well as change of the connection from a first cell to a second cell, the selection of a new channel similarly can refer to a change of a certain connection parameter such as code or frequency as well as change of the cell. Channel selection can mean, for example, selection of a new frequency in the same cell or a different cell, selection of a new cell with the same or a different frequency, selection of a different scrambling or channel code on the same or different frequency in the same or different cell, or selection of even another cellular telecommunication system. Further, the term mobile station is intended to cover any mobile communication means.

A. A First Group of Advantageous Embodiments

Figure 2:
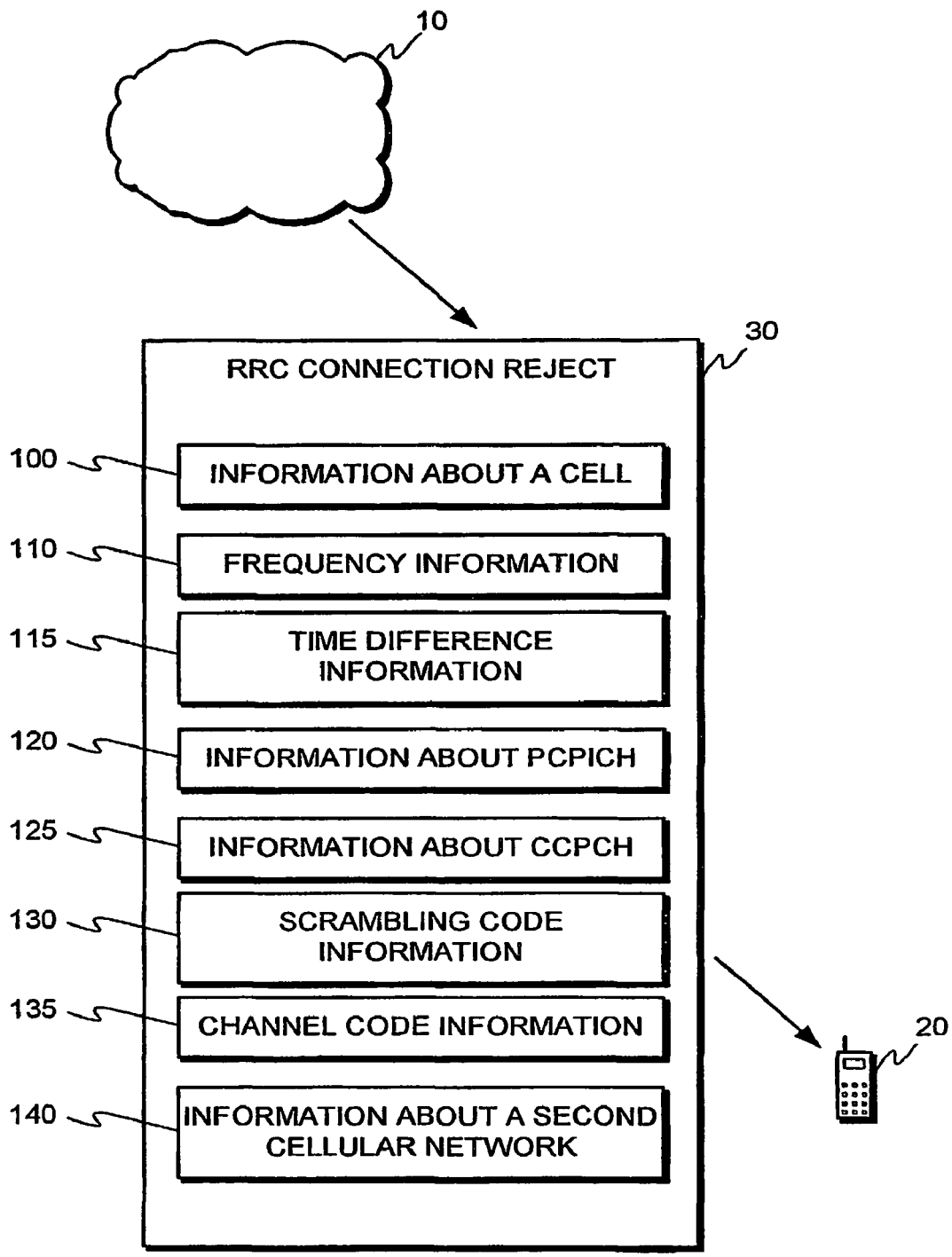
FIG. 2 illustrates a method according to an advantageous embodiment of the invention.

According to a first aspect of the invention, a channel reselection signalling method in a cellular telecommunications network is provided. This aspect of the invention is illustrated in FIG. 2. According to the method the network 10 indicates in a connection rejection message 30 to a mobile station 20 information about the value of at least one parameter relating to connection setup for use in a new connection setup attempt.

In an advantageous embodiment, said connection rejection message 30 is RRC CONNECTION REJECT message.

In an advantageous embodiment, said information comprises information 100 about a preferred channel for the next connection attempt.

In an advantageous embodiment, said information comprises frequency information 110.

In an advantageous embodiment, said information comprises information 115 about reference time difference between the previously attempted channel and the preferred channel for the next attempt.

In an advantageous embodiment, said information comprises information 120 about a primary CPICH channel (PCPICH).

In an advantageous embodiment, said information comprises information 125 about a primary CCPCH channel.

In an advantageous embodiment, said information comprises scrambling code information 130 corresponding to a certain preferred channel.

In an advantageous embodiment, said information comprises channel code information 135 corresponding to a certain preferred channel.

In an advantageous embodiment, said information comprises information 140 about a second cellular telecommunication network.

B. A Second Group of Advantageous Embodiments

Figure 1:
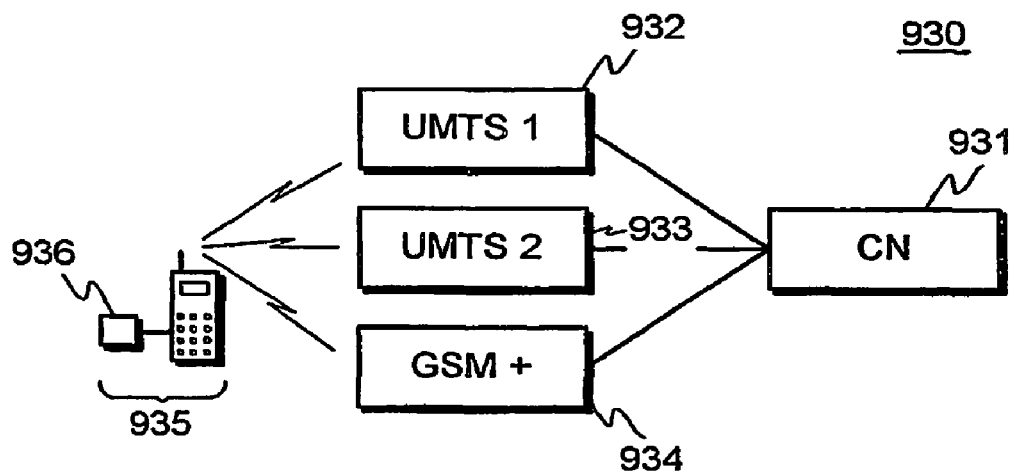
FIG. 1 illustrates a cellular telecommunications network according to prior art.
Figure 3:
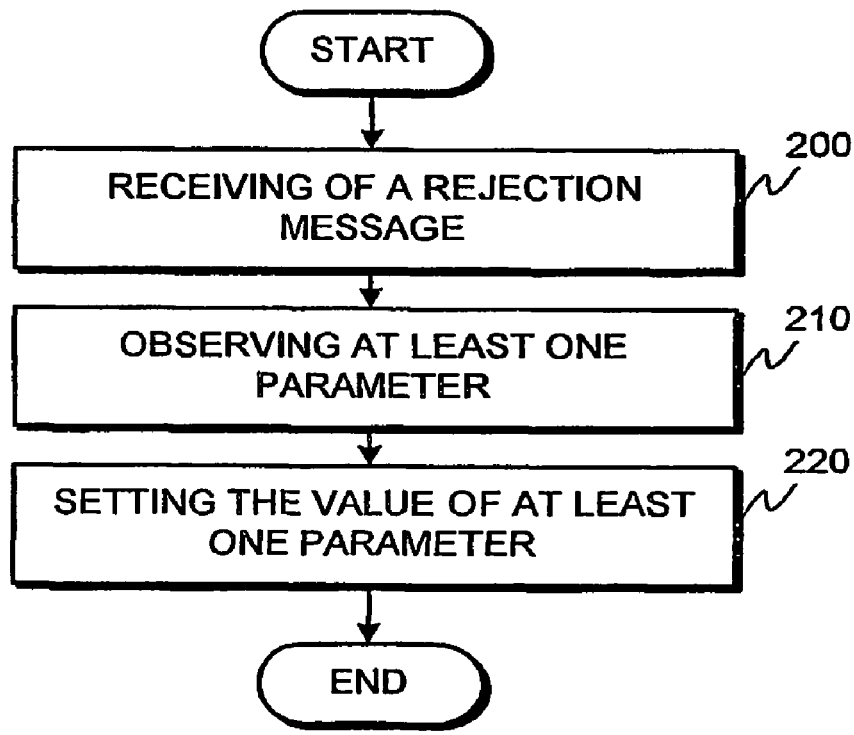
FIG. 3 illustrates a further method according to an advantageous embodiment of the invention.

According to a second aspect of the invention, a channel reselection method in a mobile communication means of a cellular telecommunication system is provided. This aspect of the invention is illustrated in FIG. 3. According to an advantageous embodiment of the invention the method comprises the steps of receiving 200 of a connection rejection message, observing 210 at least one parameter of said connection rejection message, and setting 220 the value of at least one parameter for a new connection attempt at least in part on the basis of information in at least one parameter of said connection rejection message.

According to a further advantageous embodiment of the invention, said connection rejection message is a RRC CONNECTION REJECT message.

In a further advantageous embodiment of the invention, if a predetermined parameter of said connection rejection message has a predetermined value, the value of at least one parameter for a new connection attempt is obtained from a system information message.

According to a further advantageous embodiment of the invention, the method further comprises steps of setting of a reception frequency on the basis of the value of a parameter of said connection rejection message, selecting of a channel transmitting on said reception frequency, initiating a connection setup procedure.

According to an advantageous embodiment of the invention, the reception frequency can be for example a UTRA (UMTS Terrestrial Radio Access) carrier frequency. On that frequency, the UE selects a suitable cell to camp on. Candidate cells for this selection are those cells on that frequency, which the UE was monitoring before initiating the original RRC connection setup procedure resulting in the rejection message. If no suitable cell is found, the UE can use for example the stored information cell selection procedure in order to find a suitable cell to camp on. After having camped on a cell, the UE advantageously re-initiates the RRC connection setup procedure. The stored information cell selection procedure is described for example in the 3GPP specification TS 25.304 "UE Procedures in Idle Mode".

According to a further advantageous embodiment of the invention, the method further comprises the steps of setting of a reception frequency on the basis of the value of a parameter of said connection rejection message, setting a specific channel scrambling code on the basis of the value of a parameter of said connection rejection message, and initiating a connection setup procedure.

According to a further advantageous embodiment of the invention, the method further comprises the steps of setting of a reception frequency on the basis of the value of a parameter of said connection rejection message, setting a specific channel code on the basis of the value of a parameter of said connection rejection message, and initiating a connection setup procedure.

According to a further advantageous embodiment of the invention, the method further comprises the step of setting of a timing value on the basis of the value of a parameter of said connection rejection message.

According to a further advantageous embodiment of the invention, the method further comprises the step of setting of a reception frequency on the basis of the value of a parameter of said connection rejection message.

According to a further advantageous embodiment of the invention, the method further comprises the step of setting of a timing value on the basis of the value of a parameter of said connection rejection message.

According to a further advantageous embodiment of the invention, the method further comprises the step of setting of a scrambling code parameter on the basis of the value of a parameter of said connection rejection message.

According to a further advantageous embodiment of the invention, the method further comprises the step of setting of a channel code parameter on the basis of the value of a parameter of said connection rejection message.

According to a further advantageous embodiment of the invention, the method further comprises the step of setting of a parameter describing a certain primary CPICH channel on the basis of the value of a parameter of said connection rejection message.

According to a further advantageous embodiment of the invention, the method further comprises the step of setting of a parameter describing a certain primary CCPCH channel on the basis of the value of a parameter of said connection rejection message.

According to a further advantageous embodiment of the invention, the method further comprises the step of setting of a parameter identifying a second cellular telecommunication network on the basis of the value of a parameter of said connection rejection message.

According to a further advantageous embodiment of the invention, the method further comprises the step of starting a new connection attempt at least partly according to the value of the parameter of said connection rejection message.

C. A Third Group of Advantageous Embodiments

According to a third aspect of the invention, a network element of a cellular telecommunications network is provided. In an advantageous embodiment of the invention the network element is arranged to indicate in a connection rejection message to a mobile station information about the value of at least one parameter relating to connection setup for use in a new connection setup attempt.

According to a further advantageous embodiment concerning a network element, the network element is a network element of a radio access network of a cellular telecommunications network.

According to a further advantageous embodiment concerning a network element, the network element is a radio network controller.

According to a further advantageous embodiment concerning a network element, said connection rejection message is RRC CONNECTION REJECT message.

According to a further advantageous embodiment concerning a network element, said information comprises information about a preferred channel for the next connection attempt.

According to a further advantageous embodiment concerning a network element, said information comprises frequency information.

According to a further advantageous embodiment concerning a network element, said information comprises information about reference time difference between the previously attempted channel and the preferred channel for the next attempt.

According to a further advantageous embodiment concerning a network element, said information comprises information about a primary CPICH channel.

According to a further advantageous embodiment concerning a network element, said information comprises information about a primary CCPCH channel.

According to a further advantageous embodiment concerning a network element, said information comprises scrambling code information corresponding to a certain preferred channel.

According to a further advantageous embodiment concerning a network element, said information comprises channel code information corresponding to a certain preferred channel.

According to a further advantageous embodiment concerning a network element, said information comprises information about a second cellular telecommunication network.

D. Further Considerations

The invention has several advantages. For example, the invention reduces signalling between a mobile telecommunication means and a network. No handover signalling is needed, as new information for setting up a new connection can be informed to the mobile in a rejection message.

The invention is applicable in many different cellular telecommunication systems, such as the UMTS system or the GSM system. The invention is applicable in any such cellular telecommunication system, in which the cellular telecommunication network sends a rejection message as a response to a connection setup request from a mobile station, if the network is unable to provide the requested connection.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller in the claims is intended to cover all corresponding functional entities regardless of the term used for the entity in the particular cellular telecommunication system. Further, the various message names such as the CONNECTION SETUP REJECT message name are intended to be examples only, and the invention is not limited to using the message names recited in this specification.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. An apparatus, where the apparatus is configured:
   to receive a connection rejection message in a mobile cellular network, the connection rejection message comprising a value of at least one parameter;
   to set a reception frequency for a connection setup procedure based on the value of the at least one parameter of the connection rejection message; and
   to select, for the connection setup procedure, a channel transmitting on the reception frequency based on the at least one parameter of the connection rejection message.

2. The apparatus of claim 1, where the connection rejection message is a RRC CONNECTION REJECT message.

3. The apparatus of claim 1, where the apparatus is configured, in response to a predetermined parameter of the connection rejection message having a predetermined value, to obtain the value of at least one parameter for the connection setup procedure from a system information message.

4. The apparatus of claim 1, further configured to initiate the connection setup procedure.

5. The apparatus of claim 1, further configured:
   to set a specific channel scrambling code based on the value of the at least one parameter of the connection rejection message.

6. The apparatus of claim 1, further configured:
   to set a specific channel code based on the value of the at least one parameter of the connection rejection message.

7. The apparatus of claim 6, further configured:
   to set a timing value based on the value of the at least one parameter of the connection rejection message.

8. The apparatus of claim 1, further configured:
   to set a scrambling code parameter based on the value of the at least one parameter of the connection rejection message.

9. The apparatus of claim 1, further configured:
   to set a channel code parameter based on the value of the at least one parameter of the connection rejection message.

10. The apparatus of claim 1, further configured:
    to set a parameter describing a specific primary common pilot channel based on the value of the at least one parameter of the connection rejection message.

11. The apparatus of claim 1, further configured:
    to set a parameter describing a specific primary common control physical channel based on the value of the at least one parameter of the connection rejection message.

12. The apparatus of claim 1, further configured:
    to set a parameter identifying a second cellular telecommunication network based on the value of the at least one parameter of the connection rejection message.

13. The apparatus of claim 2, further configured:
    to start the connection setup procedure based at least on the value of the at least one parameter of the connection rejection message.

14. The apparatus of claim 1, where the apparatus is embodied in a mobile terminal.

15. The apparatus of claim 1, where the apparatus is embodied in a dual-mode terminal.

16. The apparatus of claim 1, where the apparatus is embodied in a multimode terminal.

17. The apparatus of claim 1, further comprising a subscriber identity module.

18. An apparatus, where the apparatus is configured:
    to receive a connection rejection message in a mobile cellular network, the connection rejection message comprising a value of at least one parameter;

to set a reception frequency for a connection setup procedure based on the value of the at least one parameter of the connection rejection message;

to select a channel transmitting on the reception frequency; and to initiate the connection setup procedure.

19. An apparatus, where the apparatus is configured:

to receive a connection rejection message in a mobile cellular network, the connection rejection message comprising a value of at least one parameter;

to set a reception frequency for a connection setup procedure based on the value of the at least one parameter of the connection rejection message;

to set a specific channel code based on the value of the at least one parameter of the connection rejection message; and to select a channel transmitting on the reception frequency.

20. The apparatus of claim 19, further configured:

to set a timing value based on the value of the at least one parameter of the connection rejection message.

* * * * *